US008437787B2

(12) United States Patent
Shimonabe et al.

(10) Patent No.: US 8,437,787 B2
(45) Date of Patent: May 7, 2013

(54) MOBILE COMMUNICATION SYSTEM, MOBILE COMMUNICATION DEVICE, AND METHOD FOR EMPLOYING ANTENNA AND TRANSMITTING UNIT SELECTION FOR TRANSMISSION OF REFERENCE AND DATA SIGNALS

(75) Inventors: Tadashi Shimonabe, Osaka (JP); Akira Ohshima, Osaka (JP); Mitsuru Sakamoto, Osaka (JP); Yuhsuke Takagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 108 days.

(21) Appl. No.: 12/992,898

(22) PCT Filed: May 22, 2009

(86) PCT No.: PCT/JP2009/059427
§ 371 (c)(1),
(2), (4) Date: Nov. 16, 2010

(87) PCT Pub. No.: WO2009/147958
PCT Pub. Date: Dec. 10, 2009

(65) Prior Publication Data
US 2011/0081930 A1    Apr. 7, 2011

(30) Foreign Application Priority Data

Jun. 6, 2008    (JP) .............................. P2008-149885

(51) Int. Cl.
*H04B 7/00*    (2006.01)
(52) U.S. Cl.
USPC .............................. 455/507; 455/39; 370/334
(58) Field of Classification Search .................. 455/507, 455/39, 101, 500, 517; 375/295; 370/328, 370/334, 256, 144, 148
See application file for complete search history.

(56) References Cited

U.S. PATENT DOCUMENTS

2005/0018755 A1 *  1/2005  Chae et al. ..................... 375/267

FOREIGN PATENT DOCUMENTS

CN    1710826 A    12/2005

OTHER PUBLICATIONS

3GPP TSG RAN WG1 Metting #47bis, R1-070097, "Perforamnce Evaluation of Closed Loop-Based Antenna Switching Transmit Diversity in E-UTRA Uplink", Sorrento, Italy, Jan. 15-19, 2007, pp. 1-7.*

(Continued)

*Primary Examiner* — Nay A Maung
*Assistant Examiner* — Angelica Perez
(74) *Attorney, Agent, or Firm* — Birch, Stewart, Kolasch & Birch, LLP

(57) ABSTRACT

A mobile communication device includes antennas, transmitting units, and receiving units. A baseband processing unit of the mobile communication device transmits data signals to a base station device through a receiving unit and an antenna that are selected based on an instruction received from the base station device. The baseband processing unit transmits reference signals to the base station device through the transmitting units and the antennas while preventing transmission frequencies of the reference signals from overlapping one another. A baseband processing unit of the base station device transmits, to the mobile communication device, based on qualities of the received reference signals, a signal indicating information concerning which of the antennas and the transmitting units of the mobile communication device are used for transmitting the data signals, the signal also indicating information concerning whether or not to make the transmitting units and the antennas share transmission of the reference signals. Thus, interferences due to degradation of communication quality and to an increase in the number of reference signals can be prevented.

9 Claims, 4 Drawing Sheets

OTHER PUBLICATIONS

Mitsubishi Electric, "Physical Layer Parameters to Specify for Transmit Antenna Selection: Summary of Remaining UL SRS Related Issues and Way Forward", 3GPP TSG RAN WG1 Meeting #53, R1-081909, May 5-9, 2008, pp. 1-2, Kansas City, U.S.A.

Mitsubishi Electric, "UL Sounding RS Control Signaling for Closed Loop Antenna Selection", 3GPP TSG RAN WG1 Meeting #52, R1-080803, Feb. 11-15, 2008, pp. 1-7, Sorrento, Italy.

NTT DoCoMo, Institute for Infocomm Research, Mitsubishi Electric, NEC, Sharp, Toshiba Corporation, "Closed Loop Antenna Switching in E-UTRA Uplink", 3GPP TSG RAN WG1 Meeting #48, R1-070860, Feb. 12-16, 2007, pp. 1-3, St. Louis, U.S.A.

* cited by examiner

US 8,437,787 B2

MOBILE COMMUNICATION SYSTEM, MOBILE COMMUNICATION DEVICE, AND METHOD FOR EMPLOYING ANTENNA AND TRANSMITTING UNIT SELECTION FOR TRANSMISSION OF REFERENCE AND DATA SIGNALS

TECHNICAL FIELD

The present invention relates to a mobile communication system, a mobile communication device, and a mobile communication method.

Priority is claimed on Japanese Patent Application No. 2008-149885, filed Jun. 6, 2008, the content of which is incorporated herein by reference.

BACKGROUND ART

When a mobile communication device receives a transmission signal from a base station device, a variation in relative positions of the base station device and the mobile communication device causes Rayleigh fading. The Rayleigh fading causes a great variation in the phase and amplitude of reception signals. If the signal amplitude greatly decreases upon the reception causing such a variation, the characteristics of reception signals greatly degrade, thereby making it difficult for the mobile communication device to perform a demodulation process. Such a phenomenon might occur similarly in a reverse link, i.e., when the base station device receives signals transmitted from the mobile communication device.

As countermeasures to Rayleigh fading, various methods have been proposed. As one example, a mobile communication device uses multiple antennas to achieve a space diversity effect. The space diversity is a technique of transmitting or receiving signals using multiple antennas spatially separated to achieve the diversity effect. For example, when the amplitude of a reception signal transmitted from one antenna greatly decreases, an introduction of the space diversity enables transmission with the use of another antenna. The space diversity uses a characteristic that a decrease in spatial correlation between antennas causes an independent variation in reception field strength on the reception side for each signal transmitted from the antennas.

As methods of using multiple antennas, there is a method in which one of the antennas is selected for transmission. There is another method in which the antennas are weighted in some way for simultaneous transmission, and thus the directivity is controlled so as to enable optimal reception on the reception side. There is another method called an MIMO (Multi Input Multi Output) scheme in which different data strings are transmitted in parallel from the two antennas when the wave environment is good.

To select one antenna from multiple antennas of a mobile communication device, a base station device needs the following processes. Firstly, the mobile communication device transmits a reference signal from each antenna, which is a control signal. Then, the base station device receives the reference signal transmitted from each antenna of the mobile communication device, and obtains a quality index for each reference signal. Then, the base station device selects, based on the quality index, which antenna is to be used for communication.

Thus, regarding a system in which one of multiple antennas is selected for transmission, the reference signal has to be transmitted from not only the antenna from which data is being transmitted, but also from other antennas included in the mobile station. For this reason, it is necessary to periodically change the antenna and to transmit the reference signal.

Hereinafter, a process for the base station device to change antennas based on the reference signal is explained with reference to the accompanying drawings. FIG. 3 illustrates an operation of transmitting the aforementioned reference signal, and shows a state of communication from the mobile communication device to the base station device (which is referred to as "uplink") and a state of communication from the base station device to the mobile communication device (which is referred to as "downlink"). As shown in FIG. 3, the mobile communication device includes a first antenna and a second antenna. FIG. 3 shows the state of the uplink for the first antenna, the state of the uplink for the second antenna, and the state of the downlink, in this order from the top. The vertical and horizontal axes shown in FIG. 3 denote frequency and time, respectively. The black and hatched rectangles shown in FIG. 3 denote the reference signals. The white rectangle shown in FIG. 3 denotes a data signal.

As shown in FIG. 3, the mobile communication device transmits, every seven symbols, the reference signal alternately from the first and second antennas. The base station device receives the reference signals transmitted from the first and second antennas, and measures a quality of the signal transmitted from each antenna. Based on the measurement results, the base station device optimally determines a resource block (which is a unit of transmission) to be assigned for data transmission, a following modulation scheme, an encoding scheme, and the like, and then informs the mobile communication device of the determined elements.

As shown in FIG. 3, even in a period for which data signals are transmitted from the first antenna, the reference signals are transmitted alternately from the first and second antennas. This is because the antenna to be used is switched to the second antenna when the base station device determines that the quality of a signal transmitted from the second antenna is better than that of a signal transmitted from the first antenna. Because of the possibility of the antenna being switched, the reference signal has to be also transmitted from the second antenna. Hereinafter, the antenna from which data signals are being transmitted is called a "transmission antenna," and the antenna from which data signals are not being transmitted is called an "idle antenna."

In the case of FIG. 3, when the base station device receives the reference signal in a timing indicated by reference numeral 506, the base station device determines that the quality of the hatched reference signal from the second antenna is better. In this case, the base station device transmits, in a section indicated by reference numeral 516, a resource block to be assigned for data transmission, a modulation scheme, an encoding scheme, and an instruction for changing the antenna. Thus, the base station device instructs the mobile communication device to switch the transmission antenna.

Based on the instruction, the mobile communication device receiving the instruction sets, in a section indicated by reference numeral 517, the resource block to be assigned for data transmission, the modulation scheme, and the encoding scheme, and further switches the transmission antenna to the second antenna. Thus, the above operations enable stable communication with use of the optimal antenna for always. Additionally, the reference signal is used not only for the base station device to determine whether or not to switch the antenna. It is considered by LTE (Long Term Evolution in 3rd Generation Partnership Project) that the reference signal is used for determining a resource allocation, an AMC (Adaptive Modulation and Coding) scheme, and the like (see Non-Patent Document 1).

[Non-Patent Document 1] "Closed Loop antenna Switching in E-UTRA Uplink," [online], 3GPP TSG RAN WG1 Meeting #48, [searched on Jan. 18, 2008], <URL: ftp://ftp.3gpp.org/tsg_rn/WG1_RL1/TSGR1_48/Docs/R1-070860.zip>

DISCLOSURE OF THE INVENTION

Problems to be Solved by the Invention

According to the conventional technique, however, the reference signal is not transmitted from the transmission antenna in the timing in which the reference signal is transmitted from the idle antenna (the timing indicated by reference numeral 502 shown in FIG. 3). In this case, the base station device does not evaluate a quality of a reference signal transmitted from the transmission antenna in the timing indicated by the reference numeral 502. For this reason, it is difficult for the base station device to optimally control a resource allocation and the AMC with respect to the transmission antenna in the section indicated by the next reference numeral 513. To cope with such a problem, it is necessary to perform an AMC setting based on the previously-measured signal quality of the transmission antenna (the quality of the hatched portion in the timing indicated by reference numeral 501 in this case), in consideration of slight degradation of the signal quality. Consequently, a control corresponding to the newest signal quality of the transmission antenna cannot be performed, thereby causing a decrease in throughput, and therefore causing a problem of a degradation of the characteristics of the system. In other words, an optimal resource allocation and an optimal AMC scheme cannot be achieved, thereby causing a problem of a degradation of the communication quality.

As a method for solving the problems, it can be considered that the mobile communication device is provided with two systems related to signal transmitting devices including a PA, and that the reference signals are simultaneously transmitted from the transmission antenna and the idle antenna, as shown in FIG. 4. In this case, the qualities of two antennas are always measured, the antenna having the better quality is selected in a similar manner as explained above, and then the transmission antenna is switched. Therefore, a quality can be evaluated even in a timing indicated by reference numeral 602, thereby preventing the aforementioned problems.

To simultaneously transmit the reference signals from the two antennas, however, orthogonal sequences have to be used as reference signals to prevent interference. An extensively large number of orthogonal sequences are required in the uplink so that each of multiple users can simultaneously transmit reference signals from two antennas using orthogonal sequences. From the perspective of signal interferences, it is difficult to keep the orthogonality among sequences if the number of sequences is increased. Consequently, signal interferences occur, thereby causing a degradation of communication quality.

The present invention is made in consideration of the above situations. An object of the present invention is to provide a mobile communication system, a mobile communication device, and a mobile communication method for transmitting reference signals from multiple antennas while preventing a degradation of communication quality and interferences due to an increase in the number of reference signals.

Means for Solving the Problems

The present invention is a mobile communication system including: a mobile communication device; and a base station device that performs wireless communication with the mobile communication device. The mobile communication device includes: a plurality of antennas: a plurality of transmitting units; a plurality of receiving units; and a baseband processing unit that selects, based on an instruction received from the base station device through the plurality of antennas and the plurality of receiving units, one of the plurality of transmitting units and one of the plurality of antennas to be used for transmitting data signals, the baseband processing unit transmitting the data signals to the base station device through the one of the plurality of transmitting units and the one of the plurality of antennas, and the baseband processing unit transmitting reference signals having a predetermined value to the base station device through the plurality of transmitting units and the plurality of antennas while preventing transmission frequencies of the reference signals from overlapping one another. The base station device includes: an antenna; a transmitting unit; and a baseband processing unit that transmits, to the mobile communication device through the transmitting unit and the antenna based on qualities of the reference signals received through the antenna and the receiving unit, a signal indicating information concerning which of the plurality of antennas and the plurality of transmitting units of the mobile communication device are used for transmitting the data signals, the signal also indicating information concerning whether or not to make the plurality of transmitting units and the plurality of antennas share transmission of the reference signals.

The present invention is characterized in that the mobile communication device includes two sets of antennas, transmitting units, and receiving units.

The present invention is characterized in that the mobile communication device includes three or more sets of antennas, transmitting units, and receiving units.

The present invention is characterized in that the baseband processing unit of the base station device instructs the mobile station device to transmit at least the reference signals having the same frequency as those of the data signals through the same one of the plurality of transmitting unit and the same one of the plurality of antennas.

The present invention is characterized in that the baseband processing unit of the mobile station device transmits the reference signals and the data signals through different transmitting units of the plurality of transmitting units and different antennas of the plurality of antennas.

The present invention is a mobile communication device included in a mobile communication system that includes the mobile communication device and a base station device that performs wireless communication with the mobile communication device. The mobile communication device includes: a plurality of antennas: a plurality of transmitting units; a plurality of receiving units; and a baseband processing unit that selects, based on an instruction received from the base station device through the plurality of antennas and the plurality of receiving units, one of the plurality of transmitting units and one of the plurality of antennas to be used for transmitting data signals, the baseband processing unit transmitting the data signals to the base station device through the one of the plurality of transmitting units and the one of the plurality of antennas, and the baseband processing unit transmitting reference signals having a predetermined value to the base station device through the plurality of transmitting units and the plurality of antennas while preventing transmission frequencies of the reference signals from overlapping one another.

The present invention is a method for a mobile communication system including a mobile communication device and a base station device that performs wireless communication with the mobile communication device. The mobile communication device includes: a plurality of antennas; a plurality of transmitting units; a plurality of receiving units; and a baseband processing unit, and the base station device comprising: an antenna; a transmitting unit; and a baseband processing unit. The method includes: selecting, by the baseband processing unit of the mobile communication device, one of the plurality of transmitting units and one of the plurality of antennas to be used for transmitting data signals, based on an instruction received from the base station device through the plurality of antennas and the plurality of receiving units; transmitting, by the baseband processing unit of the mobile communication device, the data signals to the base station device through the one of the plurality of transmitting units and the one of the plurality of antennas; transmitting, by the baseband processing unit of the mobile communication device, reference signals having a predetermined values to the base station device through the plurality of transmitting units and the plurality of antennas while preventing transmission frequencies of the reference signals from overlapping one another; and transmitting, by the baseband processing unit of the base station device, to the mobile communication device based on qualities of the reference signals received through the antenna and the receiving unit, a signal indicating information concerning which of the plurality of antennas and the plurality of transmitting units of the mobile communication device are used for transmitting the data signals, the signal also indicating information concerning whether or not to make the plurality of transmitting units and the plurality of antennas share transmission of the reference signals.

Effects of the Invention

According to the present invention, the mobile communication device transmits the reference signal from the transmission antenna in the resource block being assigned for data transmission. The mobile communication device transmits the reference signal from another antenna other than the transmission antenna in the resource block that is not being assigned for data transmission. For this reason, a proper AMC control can be achieved based on the reference signal transmitted from the transmission antenna without the inconvenience of not being able to optimally switch the transmission antenna. Therefore, such a control can achieve the effect of preventing degradation of the communication quality.

BEST MODE FOR CARRYING OUT THE INVENTION

First Embodiment

Figure 1:
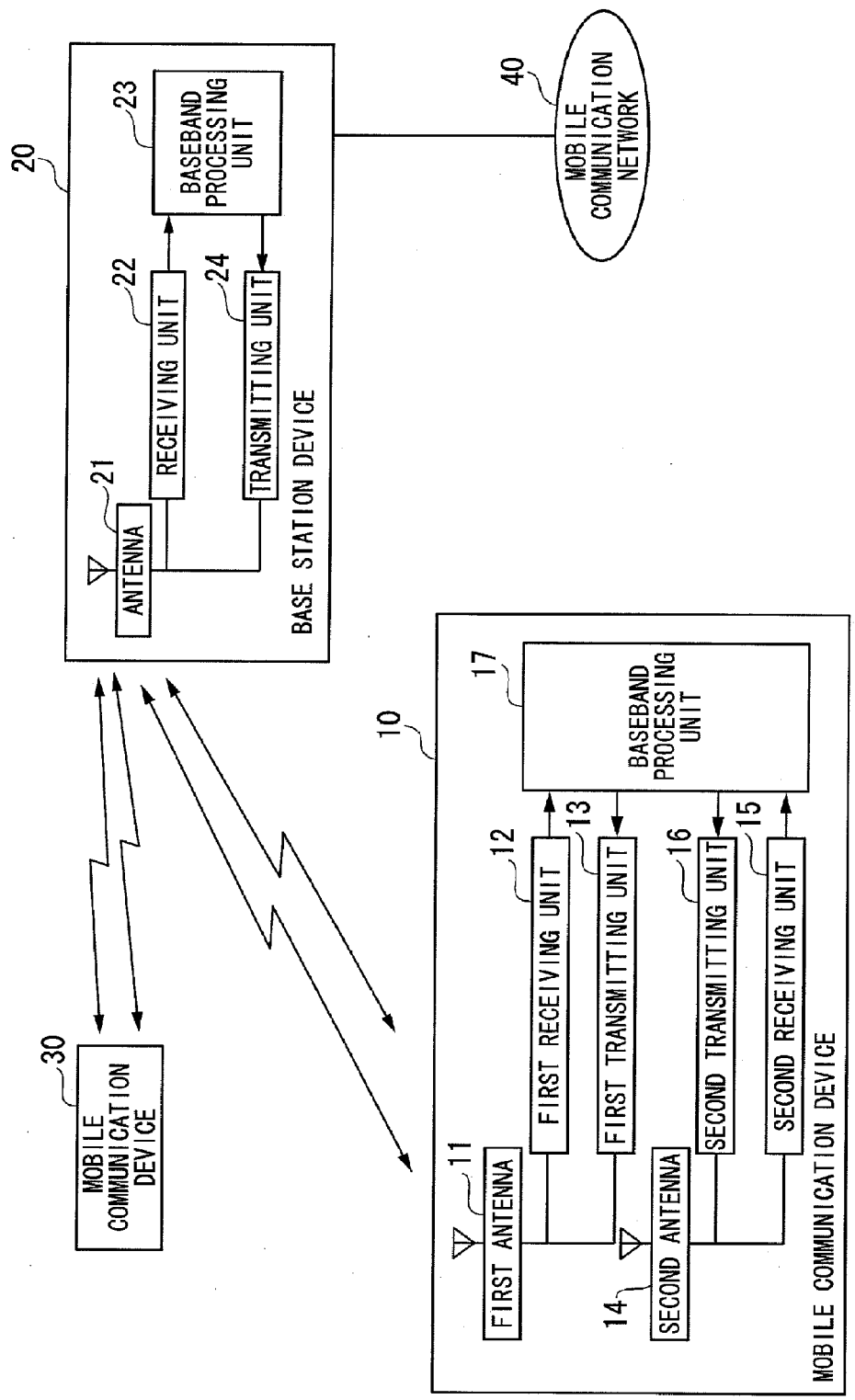
FIG. 1 is a block diagram illustrating a configuration of a first embodiment of the present invention.

Hereinafter, a mobile communication device according to a first embodiment of the present invention is explained with reference to the accompanying drawings. FIG. 1 is a block diagram illustrating a network configuration of the entire mobile communication system according to the first embodiment. The mobile communication system shown in FIG. 1 includes: mobile communication devices 10 and 30 including multiple antennas; and a base station device 20. The base station device 20 is connected to a mobile communication network 40. The mobile communication device 10 performs wireless communication with the base station device 20. The mobile communication device 10 performs wireless communication with the other mobile communication device 30 through the base station device 20 or through the base station device 20 and the mobile communication network 40. The mobile communication device 10 includes a transmission antenna and an idle antenna. The mobile communication device 10 transmits the reference signals to the base station device 20 using the antennas. Particularly, the reference signal transmitted from the idle antenna is used for the base station device 20 to determine which antenna is better to be used for wireless communication with the mobile communication device 10.

The mobile communication device 10 includes: a first antenna 11; a first receiving unit 12; a first transmitting unit 13; a second antenna 14; a second receiving unit 15; a second transmitting unit 16; and a baseband processing unit 17. A known antenna for wireless communication may be used as the first antenna 11 and the second antenna 14. The first antenna 11 supplies a received signal to the first receiving unit 12. The second antenna 14 supplies a received signal to the second receiving unit 15. The first antenna 11 transmits a signal outputted from the first transmitting unit 13. The second antenna 14 transmits a signal outputted from the second transmitting unit 16. The first receiving unit 12 converts the signal received from the first antenna 11 into a baseband signal. Then, the first receiving unit 12 performs analog-to-digital conversion to demodulate the baseband signal and outputs a digital baseband signal. The second receiving unit 15 converts the signal received from the second antenna 14 into a baseband signal. Then, the second receiving unit 15 performs analog-to-digital conversion to demodulate the baseband signal and outputs a digital baseband signal.

The baseband processing unit 17 performs diversity combining of the digital baseband signal outputted from the first receiving unit 12 and the digital baseband signal outputted from the second receiving unit 15. The baseband processing unit 17 selects a transmitting unit to be used for data transmission, and supplies a baseband data string to the selected transmitting unit (the first transmitting unit 13 or the second transmitting unit 16 in this case). The baseband processing unit 17 performs control related to transmission of the reference signal based on an instruction transmitted from the base station device 20. The control related to transmission of the reference signal will be explained later. The first transmitting unit 13 and the second transmitting unit 16 perform a transmission process, such as digital-to-analog conversion, on the baseband data string to be transmitted, which is outputted from the baseband processing unit 17.

The base station device 20 includes: an antenna 21; a receiving unit 22; a baseband processing unit 23; and a transmitting unit 24. A known antenna for wireless communication may be used as the antenna 21. The antenna 21 supplies a received signal to the receiving unit 22. The antenna 21 transmits a signal outputted from the transmitting unit 24. The receiving unit 22 converts the signal received by the antenna 21 into a baseband signal, performs analog-to-digital conversion to demodulate the baseband signal, and then outputs a digital baseband signal. The baseband processing unit 23 receives the digital baseband signal outputted from the receiving unit 22, and performs various processes. For example, the baseband processing unit 23 obtains a quality index of each reference signal received through the receiving unit 22, and selects a resource block, a modulation scheme, an encoding scheme, and an antenna, which are used for communication. Then, the baseband processing unit 23 gives instructions on the selected items to the mobile communication device 10. The transmitting unit 24 performs a transmission process, such as digital-to-analog conversion, on the baseband data string to be transmitted, which is outputted from the baseband processing unit 23.

Figure 2:
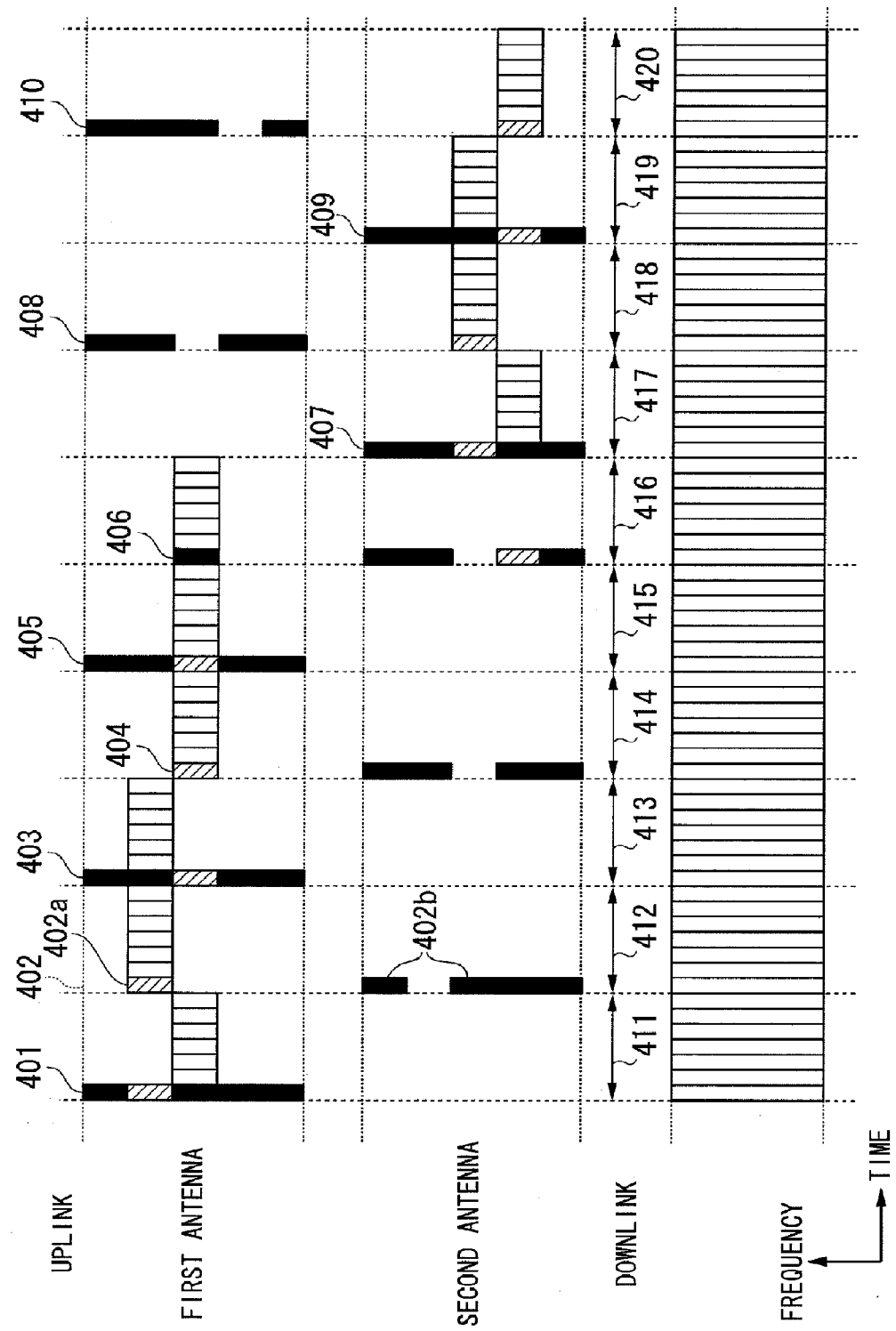
FIG. 2 illustrates an operation of a mobile communication system shown in FIG. 1 transmitting a reference signal.

Hereinafter, an operation of the mobile communication system shown in FIG. 1 transmitting a reference signal is explained with reference to FIG. 2. FIG. 2 shows a state of an uplink for the first antenna 11, a state of an uplink for the second antenna 14, and a state of a downlink, in this order from the top. Reference numerals 411 to 420 denote resource blocks, each of which is a unit of transmission. Each resource block occupies a time corresponding to seven symbols in a time direction on the horizontal axis, and a frequency corresponding to twelve subcarriers in a frequency direction on the vertical axis. A symbol block, which is defined by a time width and a frequency width corresponding to one symbol and twelve subcarriers, respectively, is denoted by small rectangles in the state of the uplink for the first antenna 11 and the state of the uplink for the second antenna 13 shown in FIG. 2. A resource block includes seven sequential rectangles in the time direction. The reference signal is a control signal, such as a pilot signal, which has a predetermined power value. The transmission timing of the reference signal is denoted by a black or hatched rectangle. The transmission timing of a data signal is denoted by a white rectangle.

Figure 3:
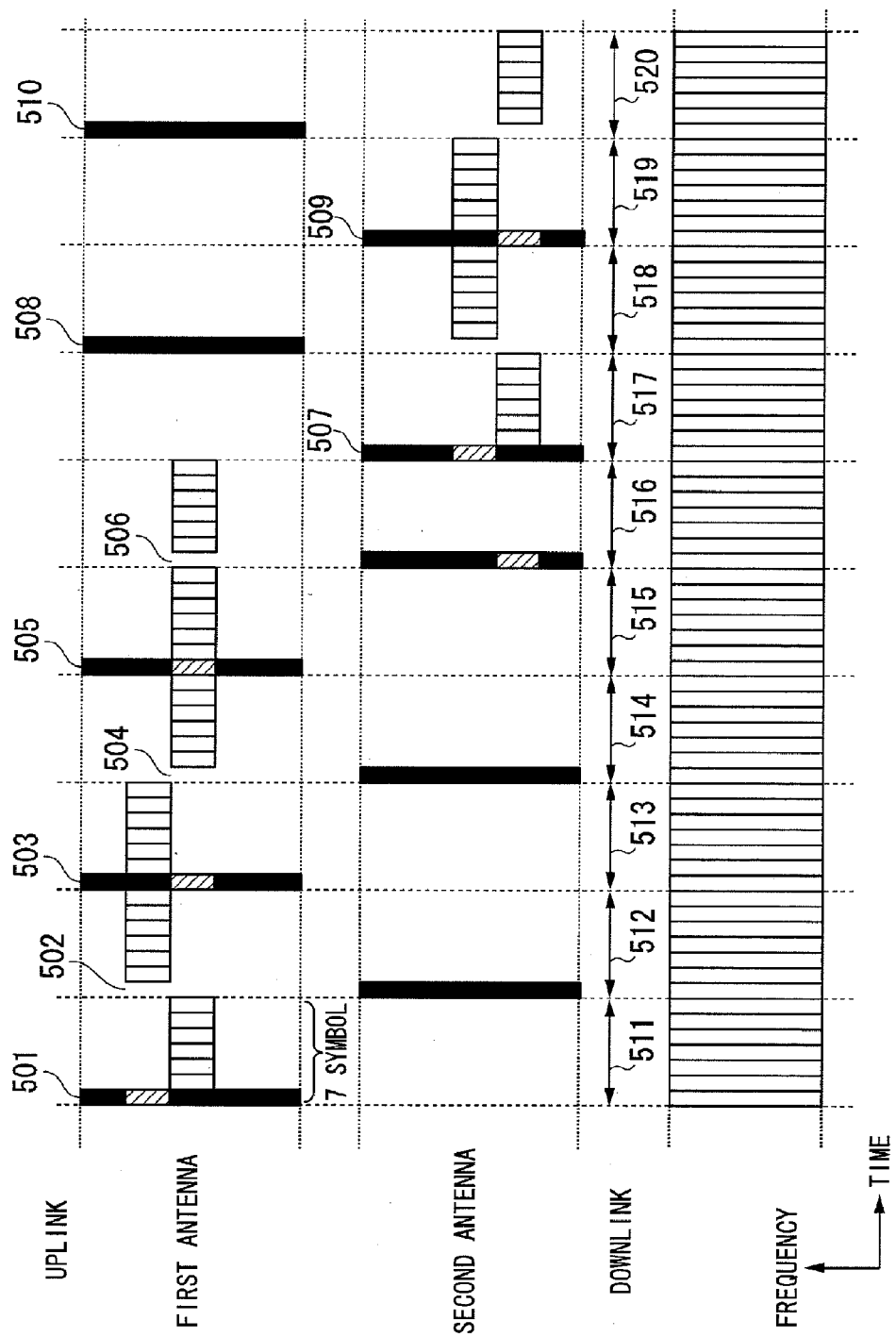
FIG. 3 illustrates an operation of a conventional technique of transmitting a reference signal.
Figure 4:
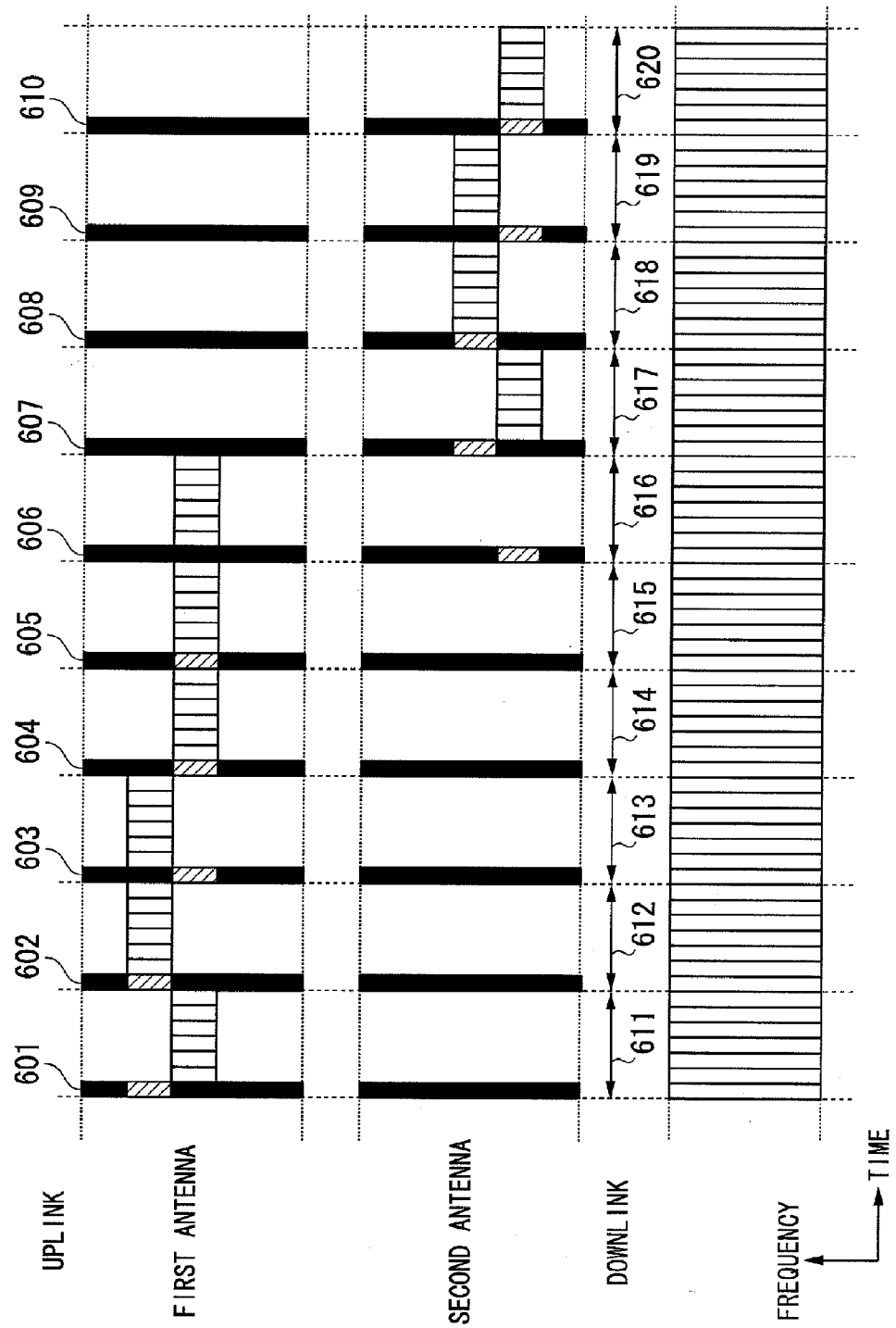
FIG. 4 illustrates an operation of a conventional technique of transmitting a reference signal.

The mobile communication device of the related art, if not including two transmission systems, has transmitted, in all the resource blocks, the reference signal from one of the transmission antenna and the idle antenna, as shown in FIG. 3. If two transmission systems are included, the mobile communication device of the related art has transmitted, in all the resource blocks, the reference signals simultaneously from the transmission antenna and the idle antenna using orthogonal sequences. On the other hand, the mobile communication system of the present invention shown in FIG. 1 transmits the reference signals alternately from the first antenna 11 and the second antenna 14 using at least four symbol blocks belonging to four resource blocks, as shown in FIG. 2. In this case, the reference signal is certainly transmitted from the transmission antenna being used for data transmission, using a symbol block belonging to the same resource block to which data signals belong. When the reference signal is transmitted from the idle antenna, the reference signal is not allocated to a symbol block for transmitting the reference signal, which belongs to the same resource block in which transmission from the transmission antenna is performed.

Hereinafter, the operation is explained in detail with an example with reference to FIG. 2. The baseband processing unit 17 transmits, to the base station device 20, the reference signals allocated to all the resource blocks for the transmission antenna (first antenna 11) through the first transmitting unit 13 and the first antenna 11 in the timing indicated by the reference numeral 401. In this case, data are transmitted from the first antenna 11 using six symbol blocks belonging to the third resource block counted from the lowest frequency, based on the instruction received through downlink from the base station device 20. It is assumed here that the quality index of the reference signal, which is transmitted using the fourth resource block (hatched rectangle) counted from the lowest frequency, is the highest among those of the reference signals that are transmitted by the mobile station device 10 in the timing and received by the base station device 20. The baseband processing unit 23 receives the reference signals in the timing indicated by the reference numeral 401 through the receiving unit 22 of the base station device 20. The baseband processing unit 23 measures a signal quality for each resource block based on the received reference signals. Then, the baseband processing unit 23 selects and determines an optimal resource block (the white rectangles in the section indicated by reference numeral 412), an optimal modulation scheme, and an optimal encoding scheme, which are used for the mobile communication device 10 to transmit data signals in the section indicated by the reference numeral 412.

Then, the baseband processing unit 23 transmits, in the section indicated by reference numeral 411, information concerning the determined resource block, the modulation scheme, and the encoding scheme to the mobile communication device 10 through the transmitting unit 24 and the antenna 21. The baseband processing unit 17 of the mobile communication device 10 receives, through the first antenna 11 and the first receiving unit 12, the information concerning the determined resource block, the modulation scheme, and the encoding scheme. Then, based on the received information, the baseband processing unit 17 transmits, through the first transmitting unit 13 and the first antenna 11, data signals to be transmitted in the section indicated by the reference numeral 412. In other words, the baseband processing unit 17 transmits the data signals using the six symbol blocks belonging to the fourth resource block counted from the lowest frequency.

The baseband processing unit 17 transmits, in the timing indicated by the reference numeral 402, the reference signal from the transmission antenna (first antenna 11) in a symbol block (indicated by reference numeral 402*a*) belonging to the resource block assigned for data transmission in the section indicated by the reference numeral 412. Additionally, the baseband processing unit 17 transmits the reference signals from the idle antenna (second antenna 14) in symbol blocks (indicated by reference numeral 402*b*) belonging to the other resource blocks. It is assumed here that the quality index of the reference signal, which is transmitted using the symbol block 402*a* (hatched rectangle) belonging to the fourth resource block counted from the lowest frequency, is the highest among those of the reference signals transmitted in this timing.

Then, the baseband processing unit 23 receives the reference signals transmitted from the mobile communication device 10 in the timing indicated by the reference numeral 402, and then measures signal qualities of the reference signals for each resource block. Then, the baseband processing unit 23 selects and determines an optimal resource block (the white rectangles in the section indicated by reference numeral 413), an optimal modulation scheme, an optimal encoding scheme, and an antenna to be used (the first antenna 11 in this case), which are used for the mobile communication device 10 to transmit data signals in the section indicated by the reference numeral 413. Then, the baseband processing unit 23 transmits, in the section indicated by reference numeral 412, information concerning the determined resource block, the modulation scheme, the encoding scheme, and the antenna to be used, to the mobile communication device 10 through the transmitting unit 24 and the antenna 21. In this case, the same resource block as selected in the section indicated by the reference numeral 412 is selected, and a switching of the transmission antenna does not occur.

The following operations are performed in a similar manner. Then, the baseband processing unit 23 receives the reference signals transmitted from the mobile communication device 10 in the timing indicated by reference numeral 406, and then measures qualities of the reference signals for each resource block. Then, the baseband processing unit 23 selects and determines an optimal resource block (the white rectangles in the section indicated by reference numeral 417), an optimal modulation scheme, an optimal encoding scheme, and an antenna to be used (the second antenna 14 in this case), which are used for the mobile communication device 10 to transmit data signals in the section indicated by the reference numeral 417. Then, the baseband processing unit 23 transmits, in the section indicated by reference numeral 416, information concerning the determined resource block, the modulation scheme, the encoding scheme, and the antenna to be used, to the mobile communication device 10 through the transmitting unit 24 and the antenna 21. In the section indicated by the reference numeral 416, the reference signal is transmitted from the first antenna 11 using a symbol block belonging to the third resource block counted from the lowest frequency. In the same section, the reference signals are transmitted from the second antenna 14 using four symbol blocks other than the symbol block belonging to the third resource block. It is assumed here that the quality index of the reference signal, which is transmitted from the second antenna 14 using the symbol block (hatched rectangle) belonging to the second resource block counted from the lowest frequency, is the highest among those of the reference signals that are transmitted by the mobile station device 10 in the timing and received by the base station device 20. Accordingly, the base station device 20 instructs, through the downlink, the mobile communication device 10 to use the second antenna 14. Based on the instruction, the baseband processing unit 17 of the mobile communication device 10 switches the transmission antenna in the section indicated by the reference numeral 417, and then transmits data signals. Hereinafter, similar operations are repeatedly performed.

Thus, in the resource block assigned for data transmission, the reference signal is transmitted from the transmission antenna (for example, the first antenna 11) using at least a symbol block belonging to the same resource block. In the resource block that is not assigned for data transmission, the reference signals are transmitted from the idle antenna (for example, the second antenna 14). Accordingly, a process of switching the transmission antenna can be optimized. Particularly, there is no case where the reference signal is not transmitted from the transmission antenna as in the case of the related art in which two transmission systems are not included. Accordingly, an optimal AMC control can be achieved. Further, there is no need to transmit the reference signals simultaneously from two antennas using orthogonal sequences as in the case of the related art in which two transmission systems are included. Accordingly, interferences due to an increase in the number of reference signals can be prevented.

Modification Example

Hereinafter, a modification example of the first embodiment is explained. Although a case where the mobile communication device 10 includes two antennas and the base station device 20 includes one antenna has been explained in the first embodiment, the number of antennas included in each of the mobile communication device 10 and the base station device 20 is not limited thereto. The mobile station device 10 may be configured to include three antennas or more. The base station device 20 may be configured to include two antennas or more. In this case, it has to be careful that the reference signals to be transmitted from multiple antennas of the mobile communication device 10 do not share the same subcarrier.

When the mobile communication device 10 includes three antennas or more, multiple idle antennas are also included. In this case, as reference-signal transmission patterns, there may be provided a pattern in which the reference signals are transmitted from all the idle antennas. There may be provided a pattern in which the reference signal is transmitted from some of the idle antennas (for example, an idle antenna corresponding to a good quality index). When there is provided a pattern in which the reference signal is transmitted from some of the idle antennas, the baseband processing unit 23 compares quality indices not only between the idle antenna and the transmission antenna, but also between the idle antennas. Then, the baseband processing unit 23 selects an idle antenna for transmitting the reference signal based on the comparison results.

Parts of the mobile communication device 10 and the base station device 20 according to the aforementioned embodiments, such as the functions of the baseband processing unit 17 and 23, may be implemented by computers built in the mobile communication device 10 and the base station device 20. In this case, a program for implementing these functions may be recorded on a computer-readable recording medium, so that a computer system may read and execute the program recorded on the recording medium to implement the functions. Here, the "computer system" includes an OS and hardware such as peripheral devices. The "computer readable recording medium" is a portable medium such as a flexible disk, a magneto-optical disc, ROM or CD-ROM, or a storage device, such as a hard disk, which is built in the computer system. Furthermore, the "computer-readable recording medium" may also include a medium that dynamically holds a program for a short period of time, such as a communication line when a program is transmitted via a network such as the Internet or a communication network such as a telephone network. Additionally, the "computer-readable recording medium" may also include a medium that holds a program for a fixed period of time, such as a volatile memory in a computer system serving as a server or a client in the above situation. Moreover, the program may be one for implementing part of the above functions, or the above functions may be implemented by combining programs already recorded on the computer system.

The embodiments of the present invention have been described in detail with reference to the drawings. However, specific configurations are not limited to the embodiments and may include any design without departing from the scope of the present invention.

INDUSTRIAL APPLICABILITY

The present invention is applicable to the field of mobile communication.

DESCRIPTION OF REFERENCE NUMERALS 10 and 30 mobile communication device
11 first antenna
12 first receiving unit
13 first transmitting unit
14 second antenna
15 second receiving unit
16 second transmitting unit
17 baseband processing unit
20 base station device 21 antenna
22 receiving unit
23 baseband processing unit
24 transmitting unit
40 mobile communication network

The invention claimed is:

1. A mobile communication system comprising:
a mobile communication device; and
a base station device that performs wireless communication with the mobile communication device,
wherein the mobile communication device comprises:
a plurality of antennas:
a plurality of transmitting units;
a plurality of receiving units; and
a baseband processing unit that selects, based on an instruction received from the base station device through the plurality of antennas and the plurality of receiving units, one of the plurality of transmitting units and one of the plurality of antennas to be used for transmitting data signals, the baseband processing unit transmitting the data signals to the base station device through the one of the plurality of transmitting units and the one of the plurality of antennas, and the baseband processing unit transmitting reference signals having a predetermined value to the base station device through the plurality of transmitting units and the plurality of antennas,
wherein the reference signals are transmitted alternately from at least one of the plurality of antennas currently sending data and at least one of a plurality of idle antennas,
wherein the reference signals are always transmitted from the at least one of the plurality of antennas sending data by using a symbol block belonging to the same resource block to which data signals are being sent; and wherein when the reference signals are transmitted from the at least one of the plurality of idle antennas, the reference signals are allocated to at least a symbol block other than the symbol block corresponding to the same resource block in which data is being transmitted from the at least one of the plurality of the antennas sending data; and
the base station device comprises:
an antenna;
a transmitting unit;
a receiving unit; and
a baseband processing unit that transmits, to the mobile communication device through the transmitting unit and the antenna based on qualities of the reference signals received through the antenna and the receiving unit, a signal indicating information concerning which of the plurality of antennas and the plurality of transmitting units of the mobile communication device are used for transmitting the data signals, the signal also indicating information concerning whether or not to make the plurality of transmitting units and the plurality of antennas share transmission of each of the reference signals.

2. The mobile communication system according to claim 1, wherein the plurality of antennas, the plurality of transmitting units, and the plurality of receiving units of
the mobile communication device comprise two sets of antennas, transmitting units, and receiving units.

3. The mobile communication system according to claim 1, wherein the plurality of antennas, the plurality of transmitting units, and the plurality of receiving units of
the mobile communication device comprise three or more sets of antennas, transmitting units, and receiving units.

4. The mobile communication system according to claim 1, wherein the baseband processing unit of the base station device instructs the mobile station device to transmit at least the reference signals having the same frequency as those of the data signals through the same one of the plurality of transmitting unit and the same one of the plurality of antennas.

5. The mobile communication system according to claim 1, wherein the baseband processing unit of the mobile station device transmits the reference signals and the data signals through different transmitting units of the plurality of transmitting units and different antennas of the plurality of antennas.

6. A mobile communication device included in a mobile communication system that comprises the mobile communication device and a base station device that performs wireless communication with the mobile communication device, the mobile communication device comprising:
a plurality of antennas:
a plurality of transmitting units;
a plurality of receiving units; and
a baseband processing unit that selects, based on an instruction received from the base station device through the plurality of antennas and the plurality of receiving units, one of the plurality of transmitting units and one of the plurality of antennas to be used for transmitting data signals, the baseband processing unit transmitting the data signals to the base station device through the one of the plurality of transmitting units and the one of the plurality of antennas, and the baseband processing unit transmitting reference signals having a predetermined value to the base station device through the plurality of transmitting units and the plurality of antennas,
wherein the reference signals are transmitted alternately from at least one of the plurality of antennas currently sending data and at least one of a plurality of idle antennas; wherein the reference signals are always transmitted from the at least one of the plurality of antennas sending data by using a symbol block belonging to the same resource block to which data signals are being sent, and
wherein when the reference signals are transmitted from the at least one of the plurality of idle antennas, the reference signals are allocated to at least a symbol block other than the symbol block corresponding to the same resource block in which data is being transmitted from the at least one of the plurality of the antennas sending data.

7. A method for a mobile communication system comprising a mobile communication device and a base station device that performs wireless communication with the mobile communication device, the mobile communication device comprising: a plurality of antennas; a plurality of transmitting units; a plurality of receiving units; and a baseband processing unit, and the base station device comprising: an antenna; a transmitting unit; a receiving unit; and a baseband processing unit, the method comprising:
selecting, by the baseband processing unit of the mobile communication device, one of the plurality of transmitting units and one of the plurality of antennas to be used for transmitting data signals, based on an instruction received from the base station device through the plurality of antennas and the plurality of receiving units;
transmitting, by the baseband processing unit of the mobile communication device, the data signals to the base station device through the one of the plurality of transmitting units and the one of the plurality of antennas;

transmitting, by the baseband processing unit of the mobile communication device, reference signals having a predetermined value to the base station device through the plurality of transmitting units and the plurality of antennas, wherein the reference signals are transmitted alternately from at least one of the plurality of antennas currently sending data and at least one of a plurality of idle antennas, wherein the reference signals are always transmitted from the at least one of the plurality of antennas sending data by using a symbol block belonging to the same resource block to which data signals are being sent; and wherein when the reference signals are transmitted from the at least one of the plurality of idle antennas, the reference signals are allocated to at least a symbol block other than the symbol block corresponding to the same resource block in which data is being transmitted from the at least one of the plurality of the antennas sending data; and transmitting, by the baseband processing unit of the base station device, to the mobile communication device based on qualities of the reference signals received through the antenna and the receiving unit, a signal indicating information concerning which of the plurality of antennas and the plurality of transmitting units of the mobile communication device are used for transmitting the data signals, the signal also indicating information concerning whether or not to make the plurality of transmitting units and the plurality of antennas share transmission of each of the reference signals.

8. The mobile communication device according to claim 6, wherein the plurality of antennas, the plurality of transmitting units, and the plurality of receiving units of the mobile communication device comprise two sets of antennas, transmitting units, and receiving units.

9. The mobile communication device according to claim 6, wherein the plurality of antennas, the plurality of transmitting units, and the plurality of receiving units of the mobile communication device comprise three or more sets of antennas, transmitting units, and receiving units.

* * * * *